United States Patent [19]
Kaspers

[11] Patent Number: 5,469,774
[45] Date of Patent: Nov. 28, 1995

[54] PNEUMATIC ACTUATING DRIVE

[75] Inventor: Rüdiger Kaspers, Tönisvorst, Germany

[73] Assignee: Arca Regler GmbH, Tonisvorst, Germany

[21] Appl. No.: 183,821

[22] Filed: Jan. 21, 1994

[30] Foreign Application Priority Data

Jan. 20, 1993 [DE] Germany ............... 93 00 685.3

[51] Int. Cl.$^6$ .................................................. F01B 29/04
[52] U.S. Cl. .................................... 91/54; 92/59; 92/110; 137/270
[58] Field of Search ................ 91/54; 92/59, 110, 92/94, 99, 100, 128; 137/270; 251/61.4

[56] References Cited

U.S. PATENT DOCUMENTS

| | | | |
|---|---|---|---|
| 4,343,224 | 8/1982 | Kemmler | 91/47 |
| 4,509,403 | 4/1985 | Gassman et al. | 91/365 |
| 4,922,952 | 5/1990 | Kemmler | 137/382 |
| 5,279,325 | 1/1994 | Kaspers | 92/59 |

FOREIGN PATENT DOCUMENTS

| | | |
|---|---|---|
| 3004106 | 8/1981 | Germany. |
| 3637068 | 6/1991 | Germany. |
| 9110959 | 10/1991 | Germany. |
| 9210096 | 9/1992 | Germany. |

*Primary Examiner*—F. Daniel Lopez
*Attorney, Agent, or Firm*—Joseph W. Berenato, III

[57] ABSTRACT

A pneumatic actuating drive (1, 61) for final control elements comprises a drive housing (6) and a drive component (15) movable therein, to which the drive component (15) is attached a drive element (24) that exits from the drive housing (6) and that can be moved together with the drive component (15), and which has the function of actuating the actuator (1, 61) and which divides the drive housing (6) into a pressure chamber (16) and a reset chamber (17) with a reset element (19, 20) that acts on the drive component (15). The actuating drive (1, 61) furthermore comprises a position controller (41) whose output (48) merges into an internal supply duct (49), which is connected to a transfer connection (35, 62) on the reset chamber side on the drive element (24), whereby the drive element (24) exhibits an air duct (30), which originates from the transfer connection (35, 62) and merges into the air duct (30). According to the invention, the reset chamber (17) has a connection aperture (34), which is connected to the air supply duct (49), and the transfer connection (35, 62) is a separate component, which has been set into the reset chamber (17), and which connects the connection aperture (34) to the air duct (30).

13 Claims, 4 Drawing Sheets

PNEUMATIC ACTUATING DRIVE

The invention relates to a pneumatic actuating drive for final control elements, particularly control valves according to the preambles of claims (1) and (2).

Such actuating drives are known in many design forms (e.g. U.S. Pat. No. 4,922,952; U.S. Pat. No. 4,509,403; U.S. Pat. No. 4,343,224; German Patent 36 37 068) and are used to drive final control elements, particularly control valves, used primarily in the control circuit of process technological systems. In most cases, they are designed as diaphragm actuating drives. Such diaphragm actuating drives have as a drive housing a regular circular diaphragm housing consisting of two screwed-together, pot-shaped housing shells, between the superimposed flanges on which is braced a diaphragm of a flexible material which functions as a drive component. In the center of the diaphragm is attached a drive rod as a drive element which is positioned movably together with the diaphragm and exits at the bottom end of the diaphragm casing. The free end of the drive rod can be connected, e.g. to the valve stem of the control valve.

To improve the control accuracy of the respective final control element, a position controller is attached to the diaphragm actuating drive. It compensates for deviations in the respective position of the final control element that are caused, e.g., by friction in fabric bushings or by reactions from the medium. The position controller is supplied with air pressure, and from its output an air supply duct extends to one of the two chambers of the diaphragm housing that are divided by the diaphragm, i.e. the pressure chamber. By controlling the air supply, the diaphragm position, and thus the position of the drive element, is influenced. The diaphragm is hereby acted upon on its side facing away from the pressure chamber by a reset element, in most cases in the form of one or more springs, which in the case of a controlled pressure reduction inside the pressure chamber brings about the resetting of the diaphragm. The reset element is arranged inside the reset chamber that is separated from the pressure chamber by the diaphragm. A ventilation duct through which the reset chamber is connected to the atmosphere originates from the reset chamber.

In one design (U.S. Pat. No. 4,922,952), the position controller is attached directly below the diaphragm housing to a yoke—also called "lantern"—located there. The pressure chamber adjoining the position controller is supplied with air over a short path via an internal air supply duct, i.e. one which does not project to the outside. In this way, complex and damage-susceptible pipework could be avoided. The arrangement also has the advantage that maladjustments during transport can no longer occur and the lifting path for the position control is protected against touch and environmental influences.

The completely encased guidance of the air supply duct is made possible if the pressure chamber is located below the diaphragm and thus adjacent to the position controller. But in almost half of the applications, the diaphragm must be acted upon with pressure from the top. In standard diaphragm actuating drives, this requirement is fulfilled in that the diaphragm housing, or at least the diaphragm with the reset element, can be easily installed in the reverse position, so that the pressure chamber and the reset chamber exchange their position relative to each other. In order to avoid complex and sensitive pipework in such cases, it was proposed that the position controller be arranged inside the diaphragm housing (German Patent 36 37 068). But this solution is complicated and results in a great structural height. Another disadvantage of this design is that the position controller cannot be installed variably.

A simpler and more compact solution was found with the actuating drive of German Registered Design 91 10 959.0. In this actuating drive, an air duct is integrated into the drive rod. At one end, this air duct reaches into the side of the diaphragm facing away from the position controller and merges into the chamber located there. At the other end, it opens into a transfer connection adjacent to the position controller. In a first installation position where the reset chamber is located on the side of the diaphragm away from the position controller, the air duct functions as a ventilator and is thus connected via the transfer connection to a corresponding ventilation duct. In the reverse, second installation position, the air duct is connected to the air supply duct and thus to the position controller. The respectively adjoining chamber is then connected directly, depending on the installation position, either to the ventilation duct or to the air duct. In this way, a completely internal pipework can be used even for actuating drives in which the driving direction can be reversed with the same parts was found.

The production of this actuating drive is nevertheless still associated with a number of processing steps that result in respectively high costs. In the case of the actuating drive of German Registered Design 92 10 096.1, the principle of the transfer connection and pressurized air supply via the drive element was thus abandoned. In this case, an air supply duct is provided inside the reset chamber, whereby said air supply duct is able to participate in the movements of the drive component, e.g. it is flexible, and which in the first installation position is connected at one end to the pressure chamber and at the other end to a connection aperture in the drive housing, through which a connection to the position controller is thus established. In the second installation position, the part of the air supply duct extending inside the reset chamber is closed. A direct connection to the position controller is then established via another connection aperture in the part of the drive housing on the pressure chamber side. The ventilation here is accomplished in each case via a corresponding duct in the drive element with an output merging into the dispersing chamber of the position controller in the area of the connection to the drive element.

This actuating drive also requires further simplification. In particular, it is not especially suitable for a module-type series of actuating drives with the greatest possible use of identical parts.

The invention is therefore based on the task of proposing an actuating drive constructed as simply as possible, and which can be modified or refitted only slightly for various types.

According to the invention, this task is solved in that the reset chamber exhibits a connection aperture connected to the air supply duct and that the transfer connection is a separate component set into the reset chamber, connecting the connection aperture to the air duct.

This invention returns to the principle of guiding the pressurized air originating from the position controller via an air duct in the drive element into the pressure chamber that is located away from the position controller. The transfer connection from the stationary air supply duct to the mobile drive element and the air duct extending inside it necessary for this, however, is arranged inside the reset chamber and forms a separately installed component there. Such a component can be designed very simply and can be installed and removed as needed. In the latter case, this results in an actuating drive in which the drive element can be driven only in one direction, without requiring modification or replacement of other parts of the actuating drive for this purpose.

The basic concept of this invention is particularly suitable for actuating drives in which the pressure chamber and the reset chamber can be exchanged with each other, e.g. by reversing the installation of the diaphragm housing, so that in a first installation position the position controller is adjoined by the reset chamber, and in a second installation position by the pressure chamber. In this case, the invention proposes that the reset chamber exhibits a first connection aperture, which for the case of the first installation position can be connected to the air supply duct, and for the second installation position can be closed, that the transfer connection is a separate component set into the reset chamber, said component connecting in the first installation position the first connection aperture to the air duct, and that the pressure chamber has a second connection aperture which for the second installation position can be connected to the air supply duct and for the first installation position can be closed.

According to the invention, the pressure chamber thus adjoins the position controller in a second installation position and then has a direct connection to the position controller via the second connection aperture and the air supply duct. In the first installation position, the reset chamber adjoins the position controller. The position controller is then connected via the air supply duct and the first connection aperture to the transfer connection which transfers the pressurized air originating from the position controller to the air duct in the drive element so that the pressurized air reaches the pressure chamber located away from the position controller. This realizes a completely internal pipework in a simple manner, whereby another advantage of the transfer connection according to the invention is that it is easy to install as a separate component, but can also be removed or even eliminated altogether in order to realize a simpler design of the actuating drive. In this manner, a series of actuating drives with different capabilities can be provided, whereby the transfer connection can be eliminated or removed for the simpler designs.

One design of the invention proposes that the air duct has an extension which extends beyond the area of the transfer connection and merges into a dispersing chamber in the area of the coupling of position controller and drive element, whereby the extension can be closed for the first installation position and opened for the second installation position, and that the transfer connection exhibits a transition aperture that can be closed for the first installation position and opened for the second installation position. This makes it possible to use the air duct in the second installation position as a ventilation duct for the reset chamber, whereby the air is ventilated into the dispersing chamber. The latter has the advantage that, in the case of an enlargement of the reset chamber, the cleaned released air coming from the position controller reaches the reset chamber.

A further characteristic of the invention provides that the air duct extends inside a tension screw with which the drive component and drive element are braced and which can be released via a closable aperture in the drive housing for changing the installation position. If the air duct is supposed to function as a ventilation duct, the end of the tension screw adjoining the extension should be closable by means of a screw plug.

The invention furthermore provides that from the drive component, on the reset chamber side, in axial extension of the drive element, a projection protrudes which in the first installation position is releasably braced on the front side with the drive element and on which rests the transfer connection in a sealing manner. The advantage is that the transfer connection remains in contact with the extension when the installation position is changed, i.e. the seal is not adversely affected.

A further design of the invention provides that the transfer connection surrounds the drive element in a sealing manner. It is also proposed that the transfer connection is attached to the inside of the drive housing's part on the reset chamber side. Hereby the transfer connection may form sealed transfer chambers together with the drive housing so that no bores are necessary.

The invention furthermore proposes that the drive housing has, on the reset chamber side, a ventilation aperture which in the first installation position has a connection to a ventilation duct merging into a dispersing chamber in the area of the coupling of drive element and position controller, and which can be closed for the second installation position. This brings about a ventilation of the reset chamber via the dispersing chamber also for the first installation position.

Normally, the transfer connection should extend outside the system of the reset element, so that the installation or removal of the latter does not change the spring preloading. But it may be useful that the transfer connection extends up into the area of the reset element and the latter then rests against it. This causes a possibly desired increase in the preloading of the reset element. In this case, the transfer connection should have guide elements for the reset element.

The drawings show the invention in more detail using an embodiment. In the drawings.

Figure 1:
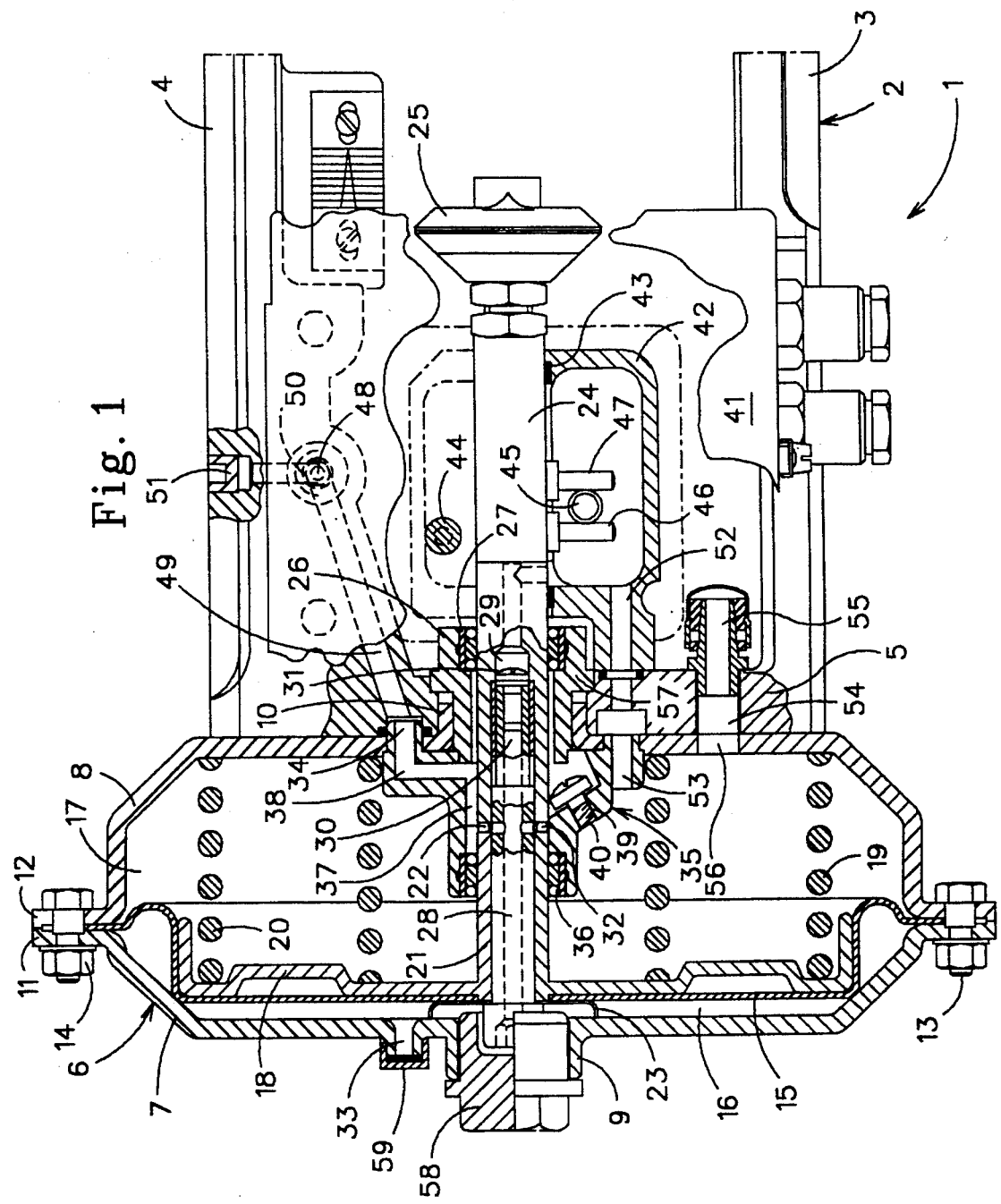
FIG. 1 shows a vertical axial section through a diaphragm actuating drive according to the invention in a first installation position.
Figure 2:
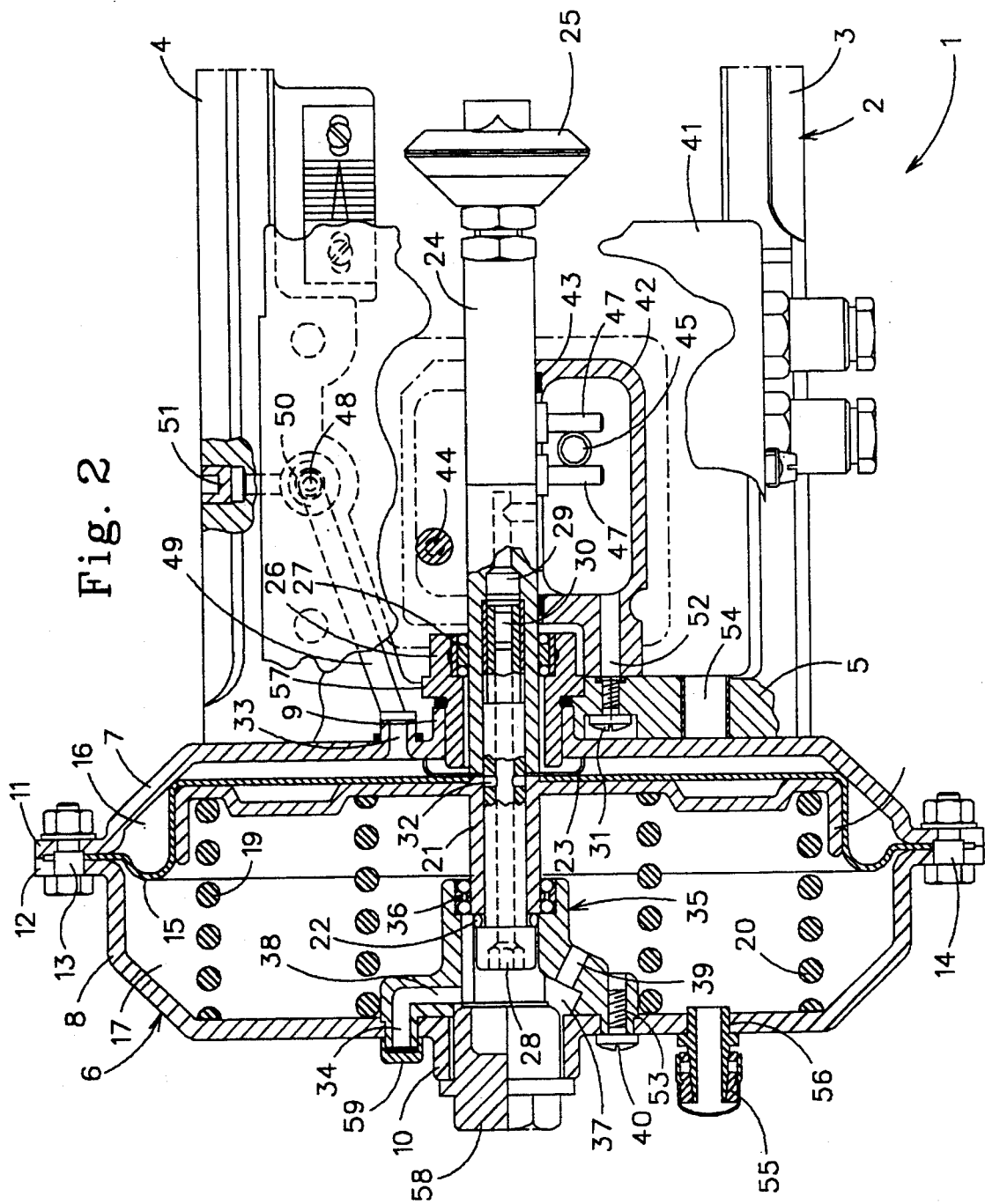
FIG. 2 shows the same section through the diaphragm actuating drive of FIG. 1 in a second installation position.

The diaphragm actuating drive (1) shown in FIGS. 1 and 2 exhibits a yoke-shaped lantern (2) having two vertical columns (3, 4) that are spaced apart and a base (5) connecting them on top. The diaphragm actuating drive (1) is mounted via the bottom (not shown) of the lantern (2) onto a final control element, e.g. a control valve.

On the top of the base (5) rests a diaphragm housing (6) consisting of two superimposed housing shells (7, 8) which, if seen from the top, are circular and have in their center outwardly projecting collars (9, 10) with internal threads and have on the edges facing each other outwardly projecting flanges (11, 12) and are there braced against each other via screws (13, 14) distributed around the circumference. Between the flanges (11, 12) is mounted a diaphragm (15) of a flexible material, e.g. rubber material. The diaphragm (15) divides the interior of the diaphragm housing (6) into a pressure chamber (16) which in FIG. 1 is located on the top and in FIG. 2 is located on the bottom, and a reset chamber (17) which in FIG. 1 is located on the bottom and in FIG. 2 on the top.

In the reset chamber (17) is located a diaphragm plate (18), which on one side rests against the diaphragm (15) and which is supported on the other side by helical springs (19, 20) constructed as pressure springs which are distributed over the circumference. The helical springs (19, 20) rest against the inside of the housing shell (8) on the reset chamber side. In the center, the diaphragm plate (18) has a through-hole with a bushing-like extension (21) extending from the latter into the reset chamber, where the end of this extension (21), located away from the diaphragm plate (18), has tooth-like projections, e.g. designated with (22). On the side facing away from the diaphragm plate (18), a stop plate (23) with a significantly smaller diameter rests against the diaphragm (15), said stop plate representing the top (FIG. 1) or bottom (FIG. 2) lifting point of the diaphragm (15) by its contact with the diaphragm housing (6).

In the center of the lantern (2), a drive rod (24) extends vertically. It is coupled via a coupling element (25), not shown in detail here, to the spindle of a control valve. Towards the top, the drive rod (24) penetrates a guide bushing (26) and in this manner projects into the diaphragm housing (6). Hereby an annular seal (27) rests against it in the area of the guide bushing (26), sealing off the inside of the diaphragm housing (6). The extension (21) forms a continuation of drive rod (24). The extension (21) is braced via a tension screw (28) screwed into an axial bore (29) in the drive rod (24) against the top frontal face of the drive rod (24). The tension screw (28) has an axially continuous air duct (30) that carries, on the bottom, an internal thread into which, according to FIG. 1, a sealing screw (31) is set. Transverse bores—e.g. designated with (32)—extend approximately centrally to the air duct.

The two housing shells (7, 8) exhibit vertically aligned connection apertures (33, 34), i.e. in the area between the helical springs (19, 20), but eccentrically to the drive rod (24). A pipe-shaped section of a molded transfer connection part (35), which surrounds the drive rod (24) in a bushing-like manner, projects into the connection aperture (34) on the reset chamber side. The molded transfer connection part (35) is attached releasably to the inside of the housing shell (8) and has at its opposite end an annular lip seal (36) that rests against the extension (21). It encloses a transfer chamber (37) from which a transfer duct (38) passes to the connection aperture (34) on the reset chamber side. The molded transfer connection part (35) also has a transition duct (39) which is closed with a sealing screw (40) in the position of FIG. 1.

A standard design position controller (41), which is only partially shown, is screwed to the side of the lantern (2) facing frontward when seen by the observer. Such position controllers are e.g. described in U.S. Pat. No. 4,509,403, U.S. Pat. No. 4,343,224, or German Patent 36 37 068. The content of said patents is referenced in this description of the position controller. On the side of the position controller (41) facing away from the observer and facing the drive rod (24), a dispersing housing (42), which is shown in a partial section, is located and surrounds the drive rod (24) according to German Registered Design 92 10 574.2 only partially at the former's back, whereby a sealing ring (43) ensures a sealing of the chamber surrounded by the dispersing housing (42). Into the dispersing housing (42) merges a release duct (44) of the position controller (41), through which the position controller (41) blows released control air into the dispersing housing (42). Furthermore, the axial bore (29) in the drive rod (24) also ends in the dispersing housing (42) with a transverse section.

The position controller (41) has, on the drive rod side, a transmission pin (45) that projects vertically to the drawing plane and is positioned so that it can swivel. This transmission pin (45) meshes essentially without play with horizontal pins (46, 47) screwed into the drive rod (24). In this manner, a vertical movement of the drive rod (24) is transmitted to the transmission pin (45). The position controller (41) is thus able to compare the lift of the drive rod (24) and the valve stem connected to it with a control signal originating from a regulating or control device and is able to perform corrections if deviations occur.

The position controller (41) exhibits a pressurized air outlet (48) that is connected in a sealed manner with a duct system in the right vertical column (4). There is a connection to a first air supply duct (49) extending through the vertical column (4) and the base (5) to the latter's top. Furthermore, a second air supply duct (50) which is closed off with a screw plug (51) branches off horizontally towards the outside. It is used when an external pipe connection to the pressure chamber (16) is realized in the position of FIG. 1.

From the dispersing housing (42), a ventilation duct (52) branches off towards the top, continuing in the base (5) and ending in a widening on the latter's top side. In the first installation position according to FIG. 1, a ventilation duct section (53) which extends through the housing shell (8) and through the molded transfer connection part (35) is positioned coaxially to this, so that there is a connection between the dispersing housing (42) and the reset chamber (17). Also integrated into the base (5) is a threaded bore (54) into whose bottom, according to FIG. 1, a ventilation plug (55) is screwed. It continues in the first installation position according to FIG. 1 in a corresponding threaded bore (56) in the housing shell (8) on the reset chamber side.

The portrayals of the diaphragm actuating drive (1) in FIGS. 1 and 2 differ in their different installation of individual parts, i.e. in the following manner.

In the first installation position according to FIG. 1, the housing shell (8) rests on the top of the base (5). The collar (10) of the housing shell (8) projects into a corresponding bore in the base (5), whereby the guide bushing (26) is screwed into the inside thread of the collar (13). The guide bushing (26) has, on the outside, an annular shoulder (57) that is supported on the bottom of the base (5), so that the diaphragm housing (6) is braced downward during the screwing in of the guide bushing (26) against the top of the base (5). A screw plug (56) is screwed in a sealing manner into the collar (9) on the top.

The diaphragm housing (6) is positioned so that the connection aperture (34) in the housing shell (8), and thus the transfer duct (38), are connected to the first air supply duct (43). The connection aperture (33) on the pressure chamber side is closed off by a sealing bonnet (59).

The projections (21) of the extension rest on the top frontal face of the drive rod (24), whereby this results in passage apertures located in the same horizontal plane as transverse bores (32). This creates a connection between the transfer chamber (27) and the air duct (30). In this way, pressurized air originating from the position controller (41) is able to pass via the pressurized air outlet (48), the first air supply duct (49), the transfer duct (38), the transfer chamber (37), the apertures between the extension (21) and the drive rod (24), the transverse bores (32), and air duct (34) into the pressure chamber (16), so that the drive rod (24) is moved vertically down when there is a corresponding pressure action against the resistance of the helical springs (19, 20). Hereby the displaced air in the reset chamber (17) is able to escape to the outside via the ventilation plug (55). In the case of a reverse movement of the diaphragm (15), i.e. if the pressure in the pressure chamber (16) is reduced, no external air is sucked in via the ventilation plug (55), since the reset chamber (17) is supplied via the dispersing housing (42), the ventilation duct (52), and the ventilation duct section (53) with waste air from the release duct (44) of the position controller (41), said air having been cleaned and freed from possible aggressive components.

In the second installation position according to FIG. 2, the diaphragm housing (6) has been rotated by 180° around a horizontal axis. For this process, the screw plug (58) is first screwed out of the collar (9). Then the tension screw (28) is screwed out of the thread in the drive rod (24). Finally, the guide bushing (26) is screwed out of the collar (10) towards the bottom. The diaphragm housing (6) can then be removed towards the top.

In the removed state, the sealing screw (40) is screwed out of the passage duct (39) and is screwed in a sealing manner from the outside into the ventilation duct section (53), so that the latter is closed. The sealing screw (59) is furthermore removed from the end aperture (34) on the reset chamber side or is set onto the section of the transfer duct (38) that projects there, so that the latter is also closed off towards the outside. The sealing screw (31) set into air duct (30) is also screwed out and is screwed from the top of the base (5) into the ventilation duct (52) so that the latter is also closed off. Finally, the ventilation plug (55) is screwed out of the threaded bore (54) and screwed into the threaded bore (56) in the housing shell (8). The diaphragm housing (6) is then prepared for the reverse installation according to FIG. 2.

For this purpose, the diaphragm housing (6) is set with the outside of the housing shell (7) onto the top of the base (5) in such a manner that the connection aperture (33) meshes with an opening in the base (5) into which the first air supply duct (49) also merges. This creates a direct connection between the position controller (41) and the pressure chamber (16) which is now located on the bottom. The tension screw (28) is then again screwed into the axial bore (29) in the drive rod (24), until the stop plate (23) is braced between the extension (21) and the top frontal face of the drive rod (24). The guide bushing (26) is furthermore screwed into the collar (9), which now projects downward into the base (5), causing the housing shell (8) on the pressure chamber side to be braced against the top of the base (5). Finally, the connection screw (58) is screwed into the collar (10), which is now positioned on the top.

In the case of pressure action on the pressure chamber (16) via the first air supply duct (49) and connection aperture (33), the drive rod (24) is moved vertically upward. The air displaced in the reset chamber (17) by this action then escapes via the ventilation plug (55). In the case of a pressure reduction, the drive rod (24) moves vertically downward. Hereby the reset chamber (17) is supplied with air from the dispersing housing (42) via the axial bore (29), the air duct (30) in the tension screw (28), and via the passage duct (39). This prevents the taking in of air through the ventilation plug (55).

Figure 3:
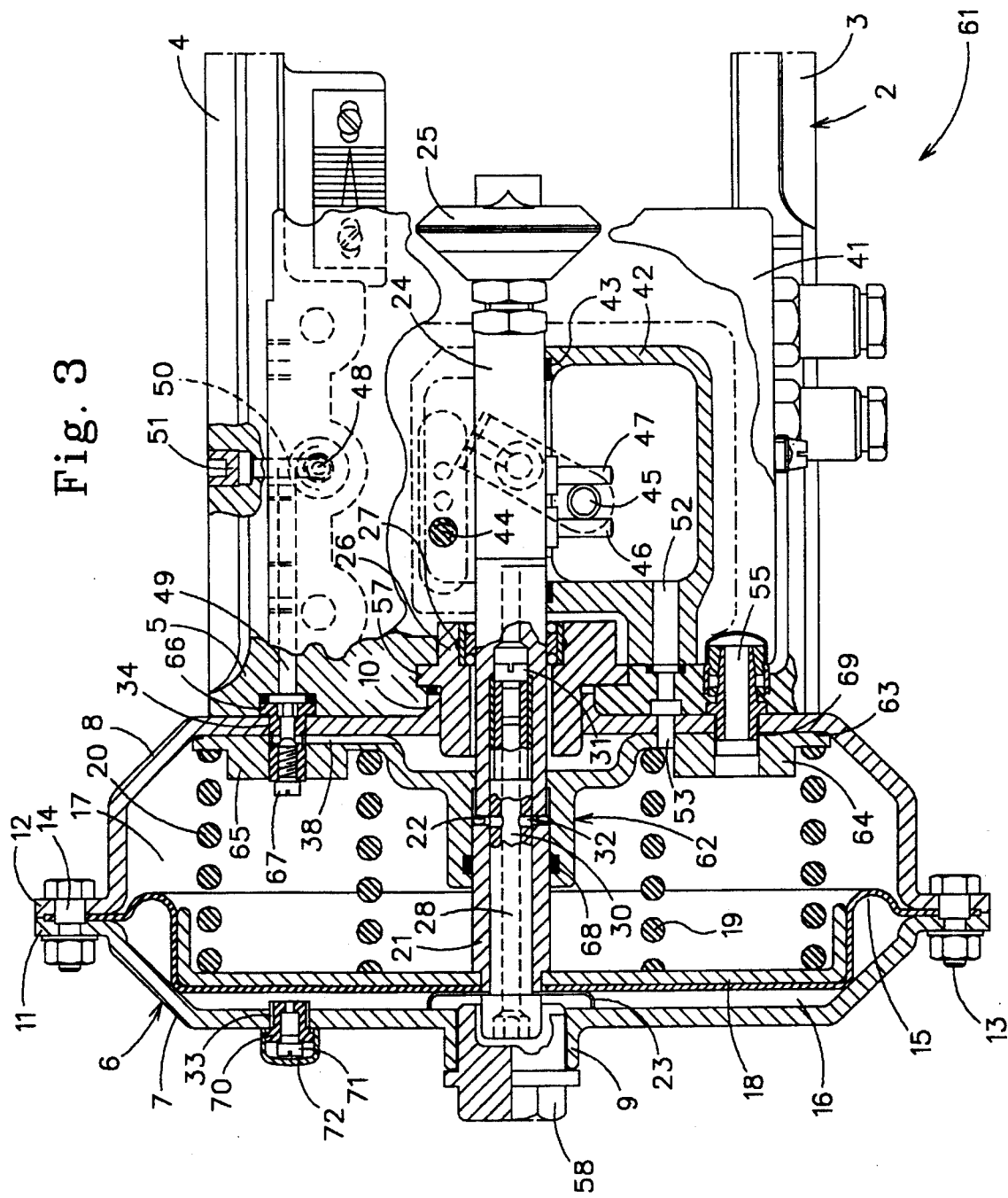
FIG. 3 shows a vertical axial section through another diaphragm actuating drive according to the invention in a first installation position.
Figure 4:
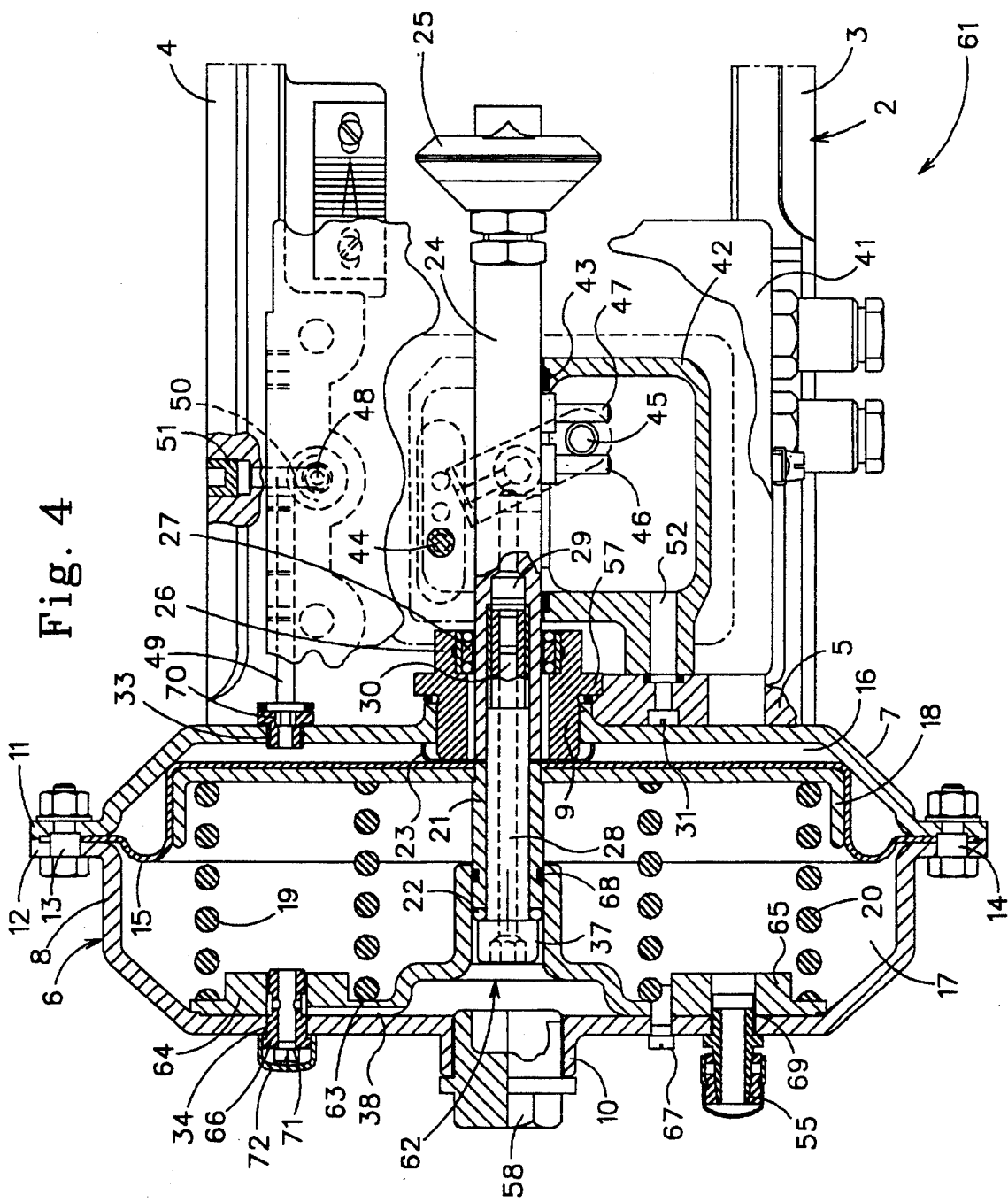
FIG. 4 shows the same section through the diaphragm actuating drive of FIG. 3 in a second installation position.

The actuating drive (61) shown in FIGS. 3 and 4 differs from the actuating drive (1) in FIGS. 1 and 2 only in the details described below, whereby FIG. 3 corresponds in relation to the installation position to FIG. 1, and FIG. 4 to FIG. 2. In FIGS. 3 and 4, those parts of the actuating drive (61) that are at least identical in function to those parts of the actuating drive (1) in FIGS. 1 and 2 are designated with the same reference numbers. In regard to these reference numbers, we refer to the description of the actuating drive (1) according to FIGS. 1 and 2.

The essential difference is that a differently designed molded transfer connection part (62) is set into the reset chamber (17). It has a transfer bottom (63) which extends over the entire horizontal area of the housing shell (8) on the pressure chamber side and rests on the inside of the housing shell (8). Due to this extension of the transfer bottom (63), the helical springs (19, 20) support themselves on the transfer bottom (63), whereby guide shoulders (64, 65) which project into the windings of the helical springs (19, 20) ensure the guidance of the helical springs (19, 20). In the embodiment according to FIGS. 1 and 2, this is accomplished by recesses in the diaphragm plate (18). In the case of identical geometry of the diaphragm housing (6), the helical screws (19, 20) are therefore subject here to a corresponding, increased preload.

The connection apertures (33, 34) are here set off towards the outside and are positioned coaxially to the axis of the windings of the helical spring (20). An insert (66), which is screwed into the guide shoulder (65) and is closed on the diaphragm plate side with a sealing screw (67), extends through the connection aperture (34) on the pressure chamber side. The insert (66) is designed so that it is hollow and is connected to the transfer duct (38) which is delimited by a groove in the transfer bottom (63) and the inside of the housing shell (8). The part of the molded transfer connection part (62) extending upward does not carry a seal in this case. To duplicate this function, an annular seal (68) is set into a groove in the mantle of the extension (21), sealing the transfer chamber (37) towards the outside.

Another difference of the control valve (1) according to FIGS. 1 and 2 is that the ventilation plug (55) is screwed directly into a threaded bore (69) in the guide shoulder (64) of the molded transfer connection part (62). This has the advantage that the ventilation plug (55) no longer needs to be screwed out and in during the change from the first installation position according to FIG. 3 into the second installation position according to FIG. 4.

Into the connection aperture (33) on the pressure chamber side is screwed a hollow screw (70) that is closed with a sealing screw (71), whereby the sealing screw (71) is protected by a sealing bonnet (72).

The function of the position controller (61) according to FIG. 3 corresponds to that of the actuating drive (1) of FIG. 1, so that we refer to the description of this actuating drive (1) in this context also. During the reinstallation into the second installation position according to FIG. 4, the process described for the actuating drive (1) according to FIGS. 1 and 2 is essentially followed. Differences exist only to the extent that the insert (66) in the connection aperture (34) is screwed out together with the sealing screw (67) after the diaphragm housing (6) has been removed, the sealing screw (67) is removed from the insert (66), the insert (66) is replaced into the connection aperture (34) and screwed into the guide shoulder (65), and the sealing screw (67) is screwed into the ventilation duct section (53) for the purpose of sealing it. Then the sealing bonnet (72) is removed and the sealing screw (71) is screwed out of the hollow screw (70). The sealing screw (71) is then again screwed into the insert (66) from the outside in such a way that the latter is closed towards the outside. The sealing bonnet (72) is replaced for protection.

I claim:

1. Pneumatic actuating drive (1, 62) for final control elements having a drive housing (6) and a drive component (15) movable therein, to which drive component (15) is releasably attached a drive element (24) that exits from the drive housing (6) and can be moved together with the drive component (15) and which divides the drive housing (6) into a pressure chamber (16) and a reset chamber (17) with a reset element (19, 20) that acts on the drive component (15), and with a position controller (41) whose output (48) merges into an internal air supply duct (49), whereby the drive housing (6) can be reversibly installed in such a manner that, in a first installation position the reset chamber (17), and in a second installation position, the pressure chamber (16) adjoins the position controller (41), and whereby furthermore the drive element (24) includes an air duct (30) that merges on a side of the drive component (15) facing away from the position controller (41) into the chamber located there, characterized in that the reset chamber (17) includes a first connection aperture (34) which for the first installation position is connected to the air supply duct (49) and for the second installation position is closed, that a transfer connection (35, 62) is a separate component set into the reset chamber (17), said transfer connection connecting in the first installation position the first connection aperture (34) to the air duct (30), and that the pressure chamber (16) has a second connection aperture (33) which for the second installation position can be connected to the air supply duct (49) and for the first installation position can be closed.

2. Actuating drive (1,62) as claimed in claim 1, characterized in that the air duct (30) has an extension (29) which extends beyond the transfer connection (35, 62) and merges into a dispersing housing (42) proximate the interconnection of the position controller (41) and drive element (24), whereby the extension (29) can be closed for the first installation position and opened for the second installation position, and that the transfer connection (35, 62) includes a transition aperture (39, 66) that can be closed for the first installation position and opened for the second installation position.

3. Actuating drive as claimed in claim 2, characterized in that an end of the tension screw (28) adjoining the extension (29) can be closed with a screw plug (31).

4. Actuating drive as claimed in claim 1, characterized in that the air duct (30) extends inside a tension screw (28) with which the drive component (15) and drive element (24) are connected and which can be released via a closable aperture (9, 10) in the drive housing (6) for changing the installation position.

5. Actuating drive as claimed in claim 1, characterized in that from the drive component (15, 18), on the side adjacent the reset chamber, in axial extension of drive element (24), a projection (21) protrudes which in the first installation position is releasably braced on the front side with drive element (24) and on which rests the transfer connection (35, 62) in a sealing manner.

6. Actuating drive as claimed in claim 1, characterized in that the drive housing (6) has, on the side adjacent said reset chamber, a ventilation aperture which in the first installation position has a connection to a ventilation duct (52) merging into a dispersing housing (42) proximate the interconnection of the drive element (24) and position controller (41), and which can be closed for the second installation position.

7. Pneumatic actuating drive (1, 61) for final control elements having a drive housing (6) and a drive component (15) movable therein, to which drive component (15) is attached a drive element (24) that exits from the drive housing (6) and can be moved together with the drive component (15) and which divides the drive housing (6) into a pressure chamber (16) and a reset chamber (17) with a reset element (19, 20) that acts on the drive component (15), and with a position controller (41) whose output (48) merges into an internal air supply duct (49) connected to a transfer connection (35, 62), whereby the drive element (24) includes an air duct (30) originating from the transfer connection (35, 62) and merging into the pressure chamber (16), characterized in that the reset chamber (17) includes a connection aperture (34) connected to the air supply duct (49) and that the transfer connection (35, 62) is a separate component set into the reset chamber (17), connecting the connection aperture (34) to the air duct (30).

8. Actuating drive (1, 62) as claimed in claim 1, characterized in that the transfer connection (35, 62) surrounds the drive element (24) in a sealing manner.

9. Actuating drive (1, 62) as claimed in claim 7, characterized in that the transfer connection (35, 62) is attached internally to the drive housing on the side adjacent said reset chamber.

10. Actuating drive (1, 62) as claimed in claim 9, characterized in that the transfer connection (35, 62) forms a sealed transfer chamber (37, 38) together with the drive housing (6).

11. Actuating drive (1, 62) as claimed in claim 7, characterized in that the transfer connection (35) extends beyond the reset element (19, 20).

12. Actuating drive (1, 62) as claimed in claim 7, characterized in that the transfer connection (62) extends up to the reset element (19, 20) and the reset element rests against the transfer connection.

13. Actuating drive (1, 62) as claimed in claim 12, characterized in that the transfer connection (62) includes guide elements (64, 65) for the reset element (19, 20).

\* \* \* \* \*